(12) United States Patent
Schneider

(10) Patent No.: US 9,428,116 B2
(45) Date of Patent: Aug. 30, 2016

(54) CENTER CONSOLE SUPPORT

(71) Applicant: Dr. Ing. h.c. F. Porsche Aktiengesellschaft, Stuttgart (DE)

(72) Inventor: Andreas Schneider, Calw (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 14/445,315

(22) Filed: Jul. 29, 2014

(65) Prior Publication Data

US 2015/0130206 A1 May 14, 2015

(30) Foreign Application Priority Data

Jul. 29, 2013 (DE) .................. 10 2013 108 101

(51) Int. Cl.
*B60R 7/04* (2006.01)
(52) U.S. Cl.
CPC ...................... *B60R 7/04* (2013.01)
(58) Field of Classification Search
CPC ....................................................... B60R 7/04
See application file for complete search history.

(56) References Cited

U.S. PATENT DOCUMENTS

| 7,533,918 | B2 | 5/2009 | Spykerman et al. | |
| 2009/0179448 | A1* | 7/2009 | Lota et al. | 296/24.34 |
| 2010/0090491 | A1* | 4/2010 | Hipshier et al. | 296/24.34 |

FOREIGN PATENT DOCUMENTS

| DE | 19932772 | 12/2000 |
| DE | 10257123 | 6/2004 |
| DE | 102004044925 | 9/2005 |
| DE | 102009058505 | 6/2011 |
| JP | 2011-218913 | 11/2011 |
| KR | 2007-0104930 | 10/2007 |

* cited by examiner

*Primary Examiner* — Glenn Dayoan
*Assistant Examiner* — Melissa A Black
(74) *Attorney, Agent, or Firm* — Gerald E. Hespos; Michael J. Porco; Mattew T. Hespos

(57) ABSTRACT

A center console has a basic support on which functional parts and trim parts are attachable. In order to provide a center console having a basic support which is of simple construction and/or is manufacturable in a cost-effective manner, the basic support (3), in a front region (5), is formed from a plastic material and, in a rear region (6), is formed from a metallic material.

9 Claims, 2 Drawing Sheets

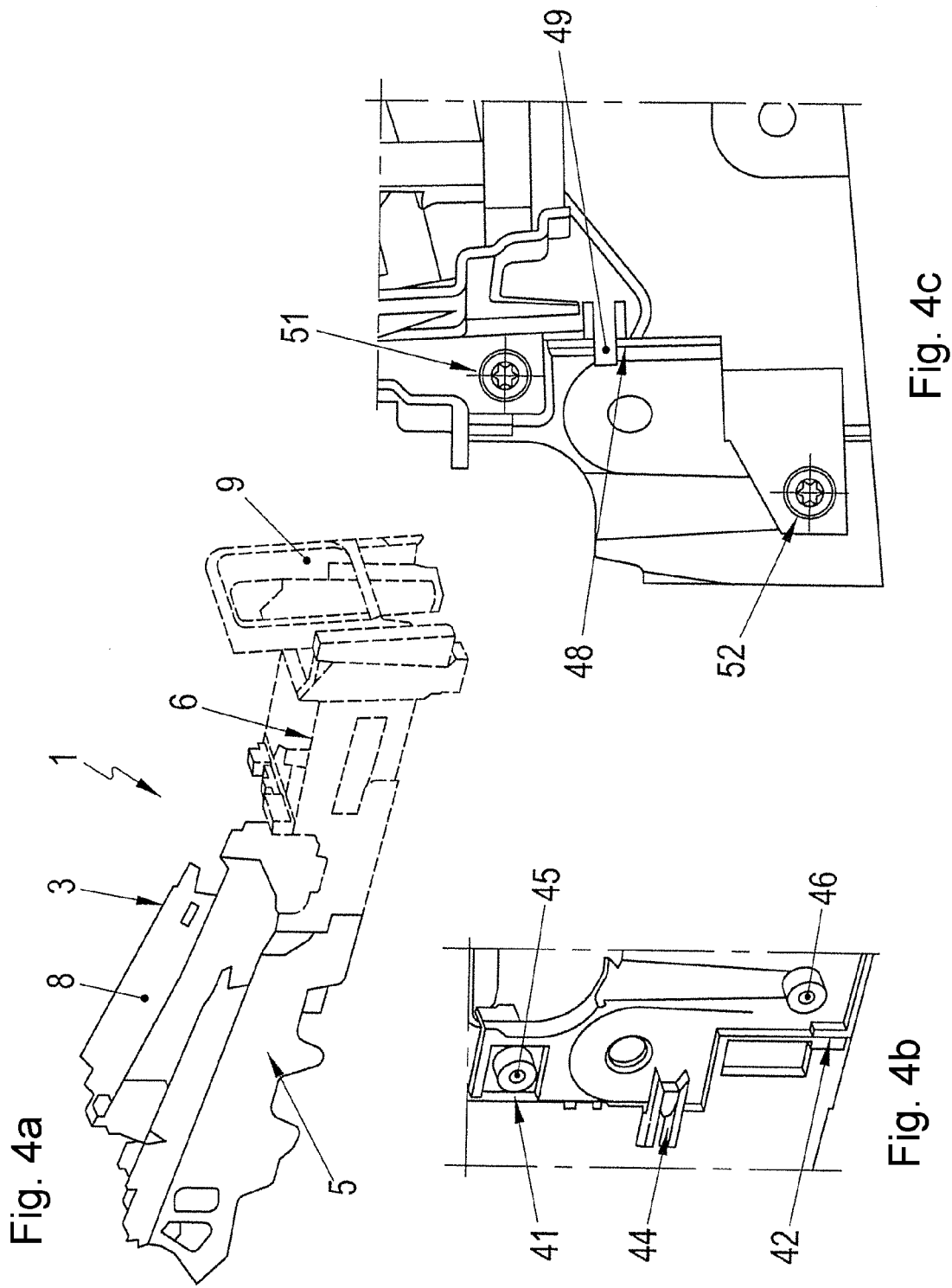

CENTER CONSOLE SUPPORT

CROSS REFERENCE TO RELATED APPLICATION

This application claims priority under 35 USC 119 to German Patent Appl. No. 10 2013 108 101.0 filed on Jul. 29, 2013, the entire disclosure of which is incorporated herein by reference.

BACKGROUND

1. Field of the Invention

The invention relates to a center console having a basic support on which functional parts and trim parts are attachable. The invention further relates to a motor vehicle having a center console of this type.

2. Description of the Related Art

DE 199 32 772 A1 discloses a center console for vehicles, having a console frame on which functional and trim parts are attachable as attachment parts. The mounting frame preferably is manufactured as a metal casting. Alternatively or in combination therewith, a rugged mounting frame made of plastic may be used. DE 102 57 123 A1 discloses a center-console part for a vehicle. The center-console part has at least one support part and at least one trim part. The support part is manufactured from plastic. A strengthening element, such as a metal-sheet insert, may be integrated in the support part.

It is an object of the invention to provide a structurally simple center console that can be manufactured in a cost-effective manner and that has a basic support on which functional parts and trim parts are attachable.

SUMMARY OF THE INVENTION

The invention relates to a center console having a basic support on which functional parts and trim parts are attachable. The basic support has a front region formed from a plastic material and a rear region formed from a metallic material. Thus, the center console does not comprise a basic support formed as one piece from a single material, but from various materials that advantageously are combined with one another in a hybrid construction so that the center console displays the same functional properties as conventional center consoles or more such properties. The terms front and rear, in the context of the present invention, relate to a front end and to a rear end of the motor vehicle. The front end of the motor vehicle also is referred to as the vehicle nose. The rear end of the motor vehicle also is referred to as the vehicle tail.

The front region of the basic support of the center console preferably comprises a front support formed from the plastic material. A front support formed from plastic material may have lower strength or ruggedness, but advantageously can display complex geometry in a simple manner.

The rear region of the basic support of the center console preferably comprises a rear support formed from the metallic material. The rear support from the metallic material advantageously displays high ruggedness and high strength in a simple manner. Thus, the rear support advantageously may define a hinge support to which hinges may be fastened.

The front support may be positioned relative to the rear support by at least one stop unit, at least one centering unit and/or at least one snap hook to preliminarily secure the front and rear supports in relation to one another. This preliminary positioning significantly simplifies the fixed connection of the front and rear supports to one another.

The front support preferably is formed from a high-strength plastic material, such as a polyamide reinforced with glass fibers. A glass-fiber reinforced polyamide material having the code designation PA66 GF50 has proved very effective.

The rear support may be a die-cast metal, such as a die aluminum or a die-cast magnesium. Alternatively, the rear support may be formed from a sheet-steel material. A plurality of sheet-steel parts advantageously may be connected to one another in an integral manner, for example by welding.

A separation plane may be arranged between the front and the rear regions, approximately in the center of the basic support when viewed in the longitudinal direction. Thus, a first half of the basic support may be composed of the plastic material and the second half of the basic support may be formed of the metallic material. Alternatively, a separation plane may be arranged between the front and the rear regions, approximately in a rear quarter of the basic support when viewed in the longitudinal direction. Thus, approximately three quarters of the basic support is composed of the plastic material and approximately one quarter is composed of the metallic material. In particular, only a region of the basic support in the rear quarter that functions for securing at least one hinge may be composed of the metallic material.

The invention further relates to a motor vehicle having a center console as described. As in conventional motor vehicles, the center console preferably is arranged between a driver seat and a passenger seat.

Further details of the invention are derived from the following description in which exemplary embodiments are described in detail with reference to the drawing.

BRIEF DESCRIPTION OF THE DRAWINGS

FIG. 4a is a second perspective view of the center console of FIG. 1 and FIGS. 4b and 4c are enlarged detailed views thereof.

DETAILED DESCRIPTION OF THE PREFERRED EMBODIMENTS

Figure 1:
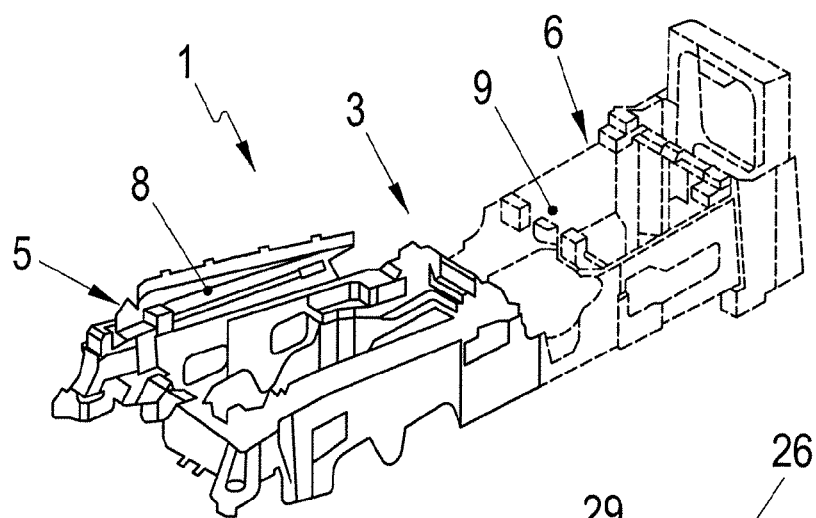
FIG. 1 is a perspective view of a center console having a basic support according to a first embodiment of the invention.
Figure 2:
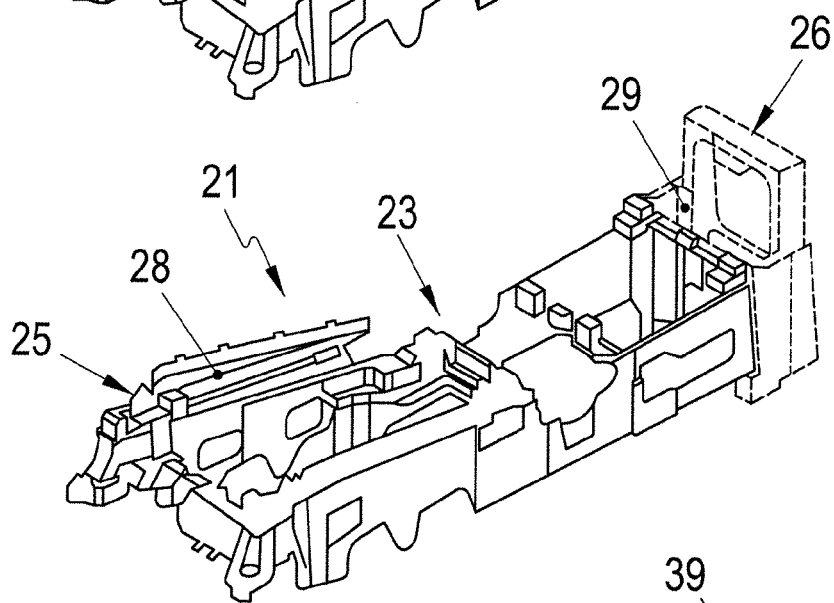
FIG. 2 is a perspective view of a center console having a basic support according to a second embodiment of the invention.
Figure 3:
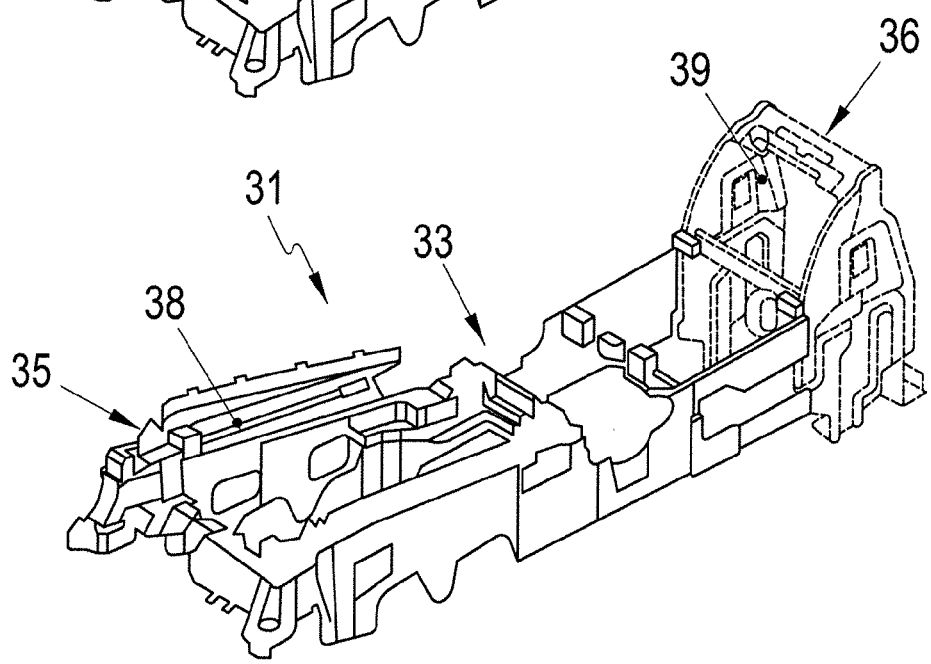
FIG. 3 is a perspective view of a center console having a basic support according to a third embodiment of the invention.

FIGS. 1 to 3 show center consoles 1; 21; 31, each of which has a basic support 3; 23; 33. Each basic support 3; 23; 33 comprises a front region 5; 25; 35 and a rear region 6 26; 36. Each front region 5; 25; 35; is formed in one piece from a high-strength plastic material and defines a front support 8; 28; 38. Each rear region 6; 26; 36 is formed in one piece from a metallic material and defines a rear support 9; 29; 39.

Each front support 8; 28; 38 preferably is injection molded from a high-strength plastic component and is installed, for example, in a region on which the knee bears during operation of a motor vehicle. Thus, each front support 8; 28; 38 normally bears comparatively small loads having forces, for example, of three hundred to five hundred Newton. This one-part front support 8; 28; 38 has proven to be advantageous for this application in terms of functionality and manufacturing costs.

The rear support 9; 29; 39 functions for fastening hinges and therefore also is referred to as hinge support. Loads having forces of up to eight hundred Newton arise on the rear support 9; 29; 39, and therefore the rear support 9; 29; 39 advantageously is cast, for example, from a magnesium die-casting material.

The front and rear supports 8, 9; 28, 29; 38, 39 may be fit and pre-latched to one another to define a structurally simple preliminary attachment that is immune to tolerances. The pre-secured front and rear supports 8, 9; 28, 29; 38, 39 subsequently may be connected fixedly to one another in a simple manner using self-tapping screws.

Various combinations of materials and partitions are possible depending on the specific configuration of the center console. The front support 8; 28; 38 formed from the plastic material advantageously is executed in an off-tool manner. This means that the finished plastic component falls from the mold and mechanical finishing can be dispensed with. Partitioning the basic support into two smaller supports advantageously enables comparatively small molds to be used.

A separation plane between the front and rear supports 8 and 9 of the basic support 3 illustrated in FIG. 1 is approximately in the center when viewed in the longitudinal direction. Depending on the execution, the front support 8 may be somewhat longer than the rear support 9. The front and rear supports 8, 9 advantageously are connected to one another in a form-fitting manner in the separation plane, for example by screwing.

The front support 8 is composed of, for example, a high-strength plastic having the code designation PA66 GF 50. Here, the capital letters PA denote polyamide. The capital letters GF denote glass fibers with which the plastic material is reinforced. The rear support 9 advantageously is executed as a magnesium die-casting.

A separation plane between the front and rear supports 28 and 29 of the basic support 23 illustrated in FIG. 2 is approximately in a rear quarter of the basic support 23 when viewed in the longitudinal direction. Accordingly, the front support 28 is clearly longer than in the case of the basic support 3 illustrated in FIG. 1. The rear support 29 is preferably is only as short as necessary for enabling fastening of the hinges. The rear support 29 here is executed as an aluminum die-casting, for example.

A separation plane between the front and rear supports 38 and 39 of the basic support 33 illustrated in FIG. 3 is approximately in a rear quarter of the basic support 33 when viewed in the longitudinal direction and in a manner similar to FIG. 2. However, in contrast to FIG. 2, the rear support 39 of FIG. 3 is formed from sheet-steel material. More particularly, the rear support 39 of FIG. 3 has a plurality of steel sheets grouped together in a welded sub-assembly and integrally connected to one another by welding.

FIGS. 4a-4c illustrate how the front and rear supports 8 and 9 of the basic support 3 of FIG. 1 are connected to one another in a form-fitting manner. In this regard, FIG. 4b illustrates stop units 41, 42 for pre-securing the front and rear supports 8 and 9. The stop units 41, 42 define stops in an x-direction of a motor vehicle and also are referred to as x-stop units. The x-direction corresponds to a vehicle longitudinal direction of the motor vehicle, the y-direction corresponds to a transverse direction of the vehicle and the z-direction is perpendicular to a plane defined by the x-direction and the y-direction. A centering unit 44 functions to center the front and rear supports 8 and 9 in relation to one another in the z-direction and in the y-direction. After pre-securing, the two supports are fixedly connected to one another by screw connections 45, 46.

FIG. 4c illustrates how the front and rear supports 8, 9 can be pre-secured in relation to one another by a positioning unit 48 that comprises a snap hook 49. The pre-secured supports are connected fixedly to one another by screw connections 51, 52. The screw connections 51, 52 are advantageously direct screw connections. Alternatively or additionally, threaded bushes may be used.

What is claimed is:

1. A center console support on which functional parts and trim parts are attachable, the center console support comprising: opposite front and rear ends spaced apart along a longitudinal direction, a front region formed from a plastic material and disposed adjacent the front end and a rear region formed from a metallic material and disposed adjacent the rear end, the front region and the rear region being joined to one another at a separation plane that is transverse to the longitudinal direction and closer to the rear end than the front end, the rear region being formed with hinge supports.

2. The center console support of claim 1, wherein the front region of the basic body comprises a front support formed from the plastic material.

3. The center console support of the claim 2, wherein the rear region of the basic support comprises a rear support formed from the metallic material.

4. The center console support of claim 3, wherein the front support is positionable in relation to the rear support by at least one of a stop unit, a centering unit and a snap hook.

5. The center console support of claim 4, wherein the front support is formed from a high-strength plastic material.

6. The center console support of claim 4, wherein the rear support is formed from a die-casting material.

7. The center console support of claim 4, wherein the rear support is formed from a sheet-steel material.

8. The center console support of claim 4, wherein the separation plane between the front region and the rear region is approximately in a rear quarter of the center console support when viewed in a longitudinal direction.

9. A motor vehicle having the center console support of claim 1.

* * * * *